Sept. 20, 1938.                    C. PRESS                    2,130,857
                                    BRAKE
                             Filed Dec. 31, 1936

INVENTOR
                                              CARL PRESS
                                          BY
                                              ATTORNEY

Patented Sept. 20, 1938

2,130,857

UNITED STATES PATENT OFFICE 2,130,857

BRAKE

Carl Press, South Bend, Ind., assignor to Bendix Products Corporation, South Bend, Ind., a corporation of Indiana Application December 31, 1936, Serial No. 118,448

6 Claims. (Cl. 188—79.5)

This invention relates to brakes, and is illustrated as embodied in an internal expanding automobile brake. An object of the invention is to provide simple means for adjusting the brake to compensate for wear, and preferably to arrange such means so that it operates automatically.

The brake illustrated has two anchored shoes, and the novel wear adjustment is shown as a part of the brake anchorage. This anchorage may include a stationary sleeve which forms the anchor of the brake, and which rotatably receives members into which are threaded thrust members engaging the shoes.

An important feature of the invention relates to operating a wear adjustment of this general type automatically, by levers or the like arranged beside the shoes and swung by the application of the shoes about a pivot at the brake anchorage, in such a manner as to operate means for turning the above-described rotatable members or the equivalent to make the desired adjustment.

Figure 1:
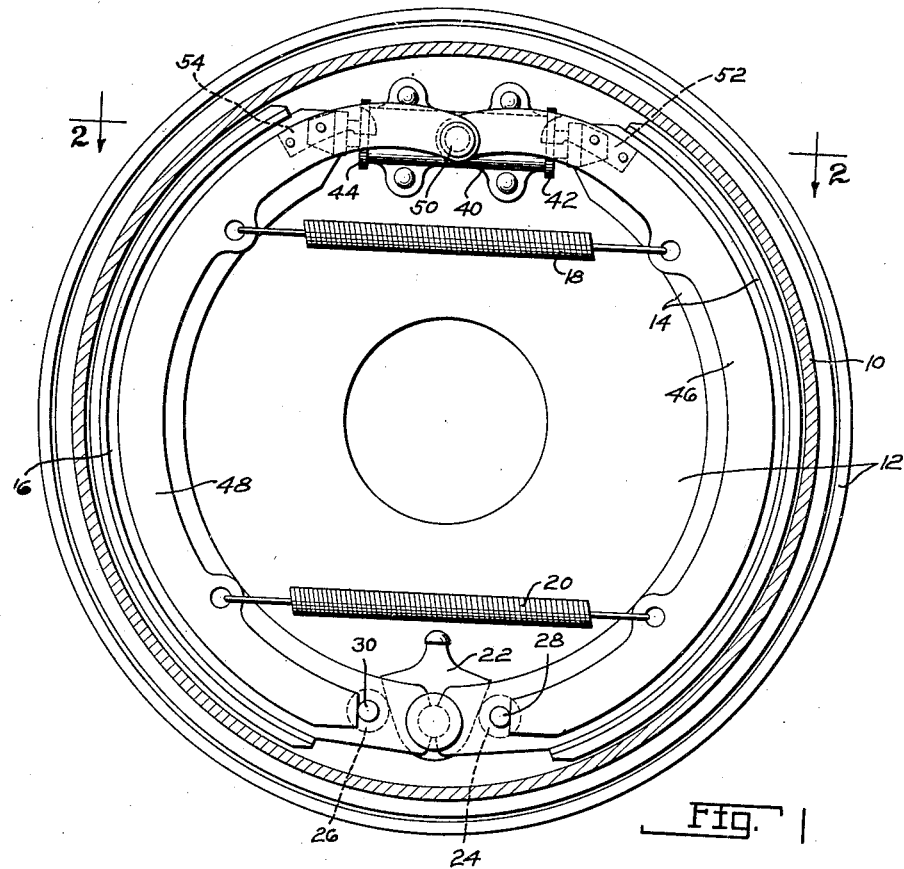
Figure 2:
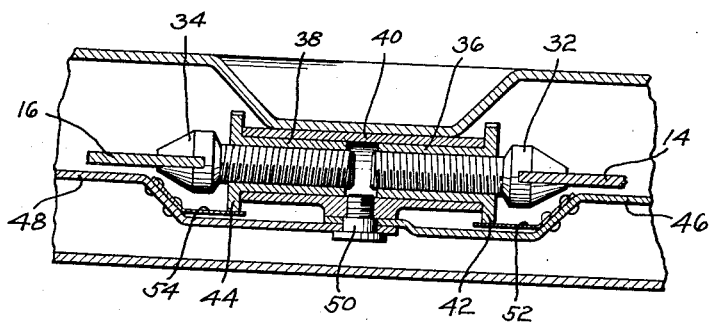

The above and other objects and features of the invention, including various novel combinations of parts and desirable particular arrangements, will be apparent from the following description of the illustrative embodiment shown in the accompanying drawing, in which:

Figure 1 is a vertical section through the brake, just inside the head of the drum, showing the brake shoes in side elevation; and Figure 2 is a partial section therethrough, on the line 2—2 of Figure 1.

The brake illustrated includes a rotatable brake drum 10, the open side of which is closed by a support such as a backing plate 12, and within which are a pair of T-section brake shoes 14 and 16 faced with the usual brake lining. These shoes are forced apart to apply the brake, against the resistance of return springs 18 and 20, by suitable means such as a wedge 22 adapted to be forced radially of the brake between rollers 24 and 26 mounted on the lower ends of the shoes by means such as pivots 28 and 30.

The upper ends of the shoes are shown seated in slots formed crosswise of the heads of oppositely threaded thrust members 32 and 34. These members are threaded into rotatable sleeve members 36 and 38 which are rotatably seated in the opposite ends of a stationary sleeve or tube 40 riveted or bolted or otherwise secured to the backing plate, and forming the anchor of the brake. The members 32 and 34 are provided with means, such as end flanges 42 and 44 (preferably formed peripherally with ratchet teeth as explained below), engaging the ends of the anchor sleeve 40, to limit relative axial or endwise movement of the parts 36—38—40.

It will be noted that members 32 and 34 are prevented from turning by their engagement with the brake shoes, whereby turning the members 36 and 38 adjusts the brake shoes to compensate for wear of the brake lining.

I prefer to make this adjustment operate automatically. To this end I provide a pair of curved levers 46 and 48, arranged beside the brake shoes and which are mounted on a pivot 50 carried by the anchor sleeve 40. The lower ends of these levers engage the pivots 28 and 30, against which they are held by the springs 18 and 20, which are tensioned between the levers rather than directly between the shoes.

These levers, adjacent the brake anchorage, are provided with spring pawls 52 and 54, or the like, shown riveted thereto and yieldingly engaging the ratchet teeth on the flanges 42 and 44. Thus excessive movement of the shoes, and consequently of pivots 28 and 30 (or either one of them), operates the adjustment.

Retrograde movement of the adjusting members 36 and 38 is prevented by the friction between those parts and the parts 40—32—34, although suitable spring holding pawls may be mounted on the backing plate if desired.

While one illustrative embodiment has been described in detail, it is not my intention to limit the scope of the invention to that particular embodiment, or otherwise than by the terms of the appended claims.

I claim:

1. A brake comprising a pair of shoes having adjustable anchorage means at one side of the brake, members arranged beside the shoes and which are moved in opposite directions by the application of the brake, and means operated by said members and operative to adjust said anchorage means.

2. A brake comprising a pair of shoes having adjustable anchorage means at one side of the brake, levers arranged beside the shoes and which are fulcrumed on a fixed pivot adjacent the anchorage means and which are moved in opposite directions by the application of the brake, and means operated by angular movement of said levers upon their pivot and operative to adjust said anchorage means.

3. A brake comprising a shoe having an adjustable anchorage at one end and applying means at the other end, a lever arranged beside the shoe substantially for the length of the shoe and pivoted adjacent the anchorage at one end and swung on its pivoted end when the shoe is applied by said means, means engaging the other end of the lever adjacent the unanchored end of the shoe to swing the lever about its pivoted end when the brake is applied, and means operated by the swinging of said lever to adjust said anchorage.

4. A brake comprising a shoe having an anchorage at one end including a threaded member arranged to be turned to adjust the shoe for wear and having applying means at the other end, a lever arranged beside the shoe substantially for the length of the shoe and pivoted adjacent the anchorage at one end and swung on its pivoted end when the shoe is applied by said means, means engaging the other end of the lever adjacent the unanchored end of the shoe to swing the lever about its pivoted end when the brake is applied, and a pawl operated by the swinging of said lever to turn said member to adjust said shoe.

5. A brake comprising a pair of shoes, applying means for said shoes at one side of the brake, a stationary sleeve at the other side of the brake between the ends of said shoes, rotatable sleeves seated in opposite ends of the stationary sleeve, and thrust members threaded into said rotatable sleeves respectively and respectively engaging the ends of the shoes to serve as anchorages therefor.

6. A brake comprising a shoe, a stationary sleeve adjacent the end of said shoe, a rotatable sleeve seated in the end of the stationary sleeve, and a thrust member threaded into said rotatable sleeve and engaging the end of the shoe to serve as an anchorage therefor, said stationary sleeve having mounted thereon means operated by excessive movement of the shoe to turn said rotatable sleeve to adjust the thrust member to compensate for wear of the shoe.

CARL PRESS.